United States Patent [19]

Clutter

[11] 4,280,013
[45] Jul. 21, 1981

[54] INSULATOR COVER

[75] Inventor: Melvin E. Clutter, Centralia, Mo.

[73] Assignee: A. B. Chance Company, Centralia, Mo.

[21] Appl. No.: 159,490

[22] Filed: Jun. 16, 1980

[51] Int. Cl.³ .................... H02G 1/02; H01B 17/00
[52] U.S. Cl. ................................. 174/5 R; 174/139
[58] Field of Search .......... 174/5 R, 135, 136, 138 F, 174/139, 155

[56] References Cited

U.S. PATENT DOCUMENTS

| | | | |
|---|---|---|---|
| 568,060 | 9/1896 | Wood | 174/155 |
| 992,738 | 5/1911 | Marshall | 174/5 R |
| 1,141,674 | 6/1915 | Withers | 174/5 R |
| 1,598,155 | 8/1926 | Salisbury | 174/5 R |
| 1,668,513 | 5/1928 | Millward | 174/5 R |
| 1,877,035 | 9/1932 | Palmer | 174/136 |
| 2,770,667 | 11/1956 | Runde | 174/5 R |
| 2,871,282 | 1/1959 | Tipsord et al. | 174/5 R |
| 3,835,238 | 9/1974 | West | 174/5 R |
| 3,922,476 | 11/1975 | Clutter et al. | 174/5 R |

FOREIGN PATENT DOCUMENTS 705117 4/1966 Italy ........................... 174/139

Primary Examiner—Laramie E. Askin
Attorney, Agent, or Firm—Schmidt, Johnson, Hovey & Williams

[57] ABSTRACT

A two piece, open-ended, telescopically interfitted, synthetic resin insulative protective cover for one or more pin-type or post-type, conductor-supporting insulators is provided which has a configuration for substantially enveloping such insulators to thereby minimize the risk of inadvertent contact with the energized conductor, while also being easily installable using conventional hot-line tools by a lineman remote from the conductor and associated equipment. The cover preferably includes two separate sections which are individually installed and axially telescoped together over the insulator to give the complete cover. Each section has walls defining an elongated, insulator-receiving space and a longitudinal slot between the opposed bottom wall portions thereof. The male and female sections include appropriate connection structure in the form of outwardly extending, shoulder-defining surfaces at the ends thereof for positive interconnection of the sections together and to associated spiral-type conductor covers. In addition, stop walls provided on the sections limit the extent of telescopic interfitting of the components of the cover-up assembly. Tabs are also provided on the respective sections for connecting the latter to a manipulative hot line tool so that the individual sections can be safely installed and interfitted by a lineman positioned at a safe distance from the energized conductor.

5 Claims, 9 Drawing Figures

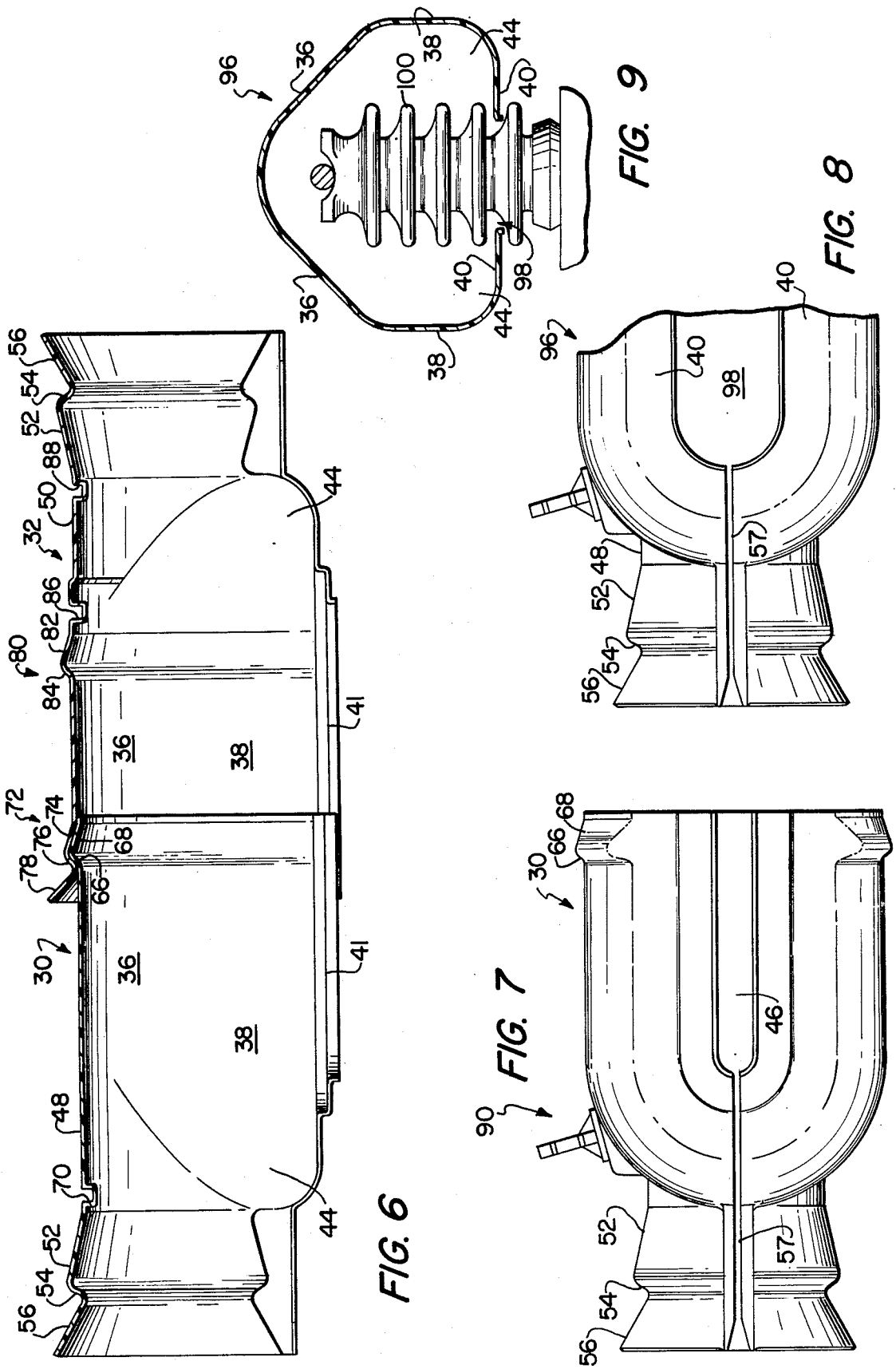

INSULATOR COVER

BACKGROUND OF THE INVENTION

1. Field of the Invention

This invention relates to removable insulative line covers which are especially adapted for use in and around pin-type and post-type insulators, so as to protect linemen and others working in the vicinity thereof. More particularly, it is concerned with a two-piece insulator cover which is configured to substantially completely envelop one or more insulators and be easily installable through the use of elongated manipulative tools in common use.

2. Description of the Prior Art

Electrical utility linemen and others are often required to work on or about energized conductors at elevated heights either on electrical poles and towers or in buckets of aerial devices where they are in close proximity to energized conductors. In such situations a hazard is produced by the proximity of the energized line which prevents the linemen from working with their usual freedom of movement and speed, because of the constant fear of receiving shocks or burns as a result of accidental contact with the energized lines or associated equipment. Hence, in order to permit safe, more efficient working conditions in such areas, energized conductors and the like must be temporarily insulated, preferably by quickly and easily installable, removable protective devices. In fact, if satisfactory insulative covers are not available, the line must generally be deenergized before work is attempted. This practice is very costly and disrupts normal electrical service.

A number of specialized protective devices have been proposed in the past. For example, U.S. Pat. No. 3,835,238 (which is incorporated herein by reference) discloses a so-called "spiral conductor cover" for covering elongated sections of overhead conductors. However, such spiral covers are not adapted for covering conductor-supporting insulators normally mounted on crossarms. Therefore, it has been the common practice to employ somewhat U-shaped, open bottom covers over such insulators, with respective spiral devices being interconnected with the U-shaped members at opposite ends of the latter. While this arrangement provides a degree of protection, it is far from ideal. Specifically, the large opening at the bottom of the U-shaped hoods or covers is a potential source of danger since a wire or hand can inadvertently contact the conductor from beneath.

At the same time, any device adapted for installation on energized conductors and the like must be easily installable, preferably through the use of elongated hot-line sticks or insulated manipulative equipment. As can be appreciated, specialized covers which exactly conform to the shape of a pin-type insulator can be provided, but the risks inherent in installing such a cover by hand, as would probably be necessary, would outweigh the benefit obtained.

Accordingly, there is a decided need in the art for an insulative cover which meets the criteria of adequately protecting and covering one or more insulators and the section of conductor supported thereby, while at the same time being easily installable by linemen at a position remote from the energized equipment.

Additional patents illustrating various types of spiral conductor covers and other protective equipment, including those designed for insulators, include the following: U.S. Pat. Nos. 568,060, 992,738, 1,141,674, 1,598,155, 1,877,035, 1,668,513, 2,770,667, 2,871,282 and 3,922,476; also, see Italian Pat. No. 705,117.

SUMMARY OF THE INVENTION

The problems noted above are in large measure overcome by the present invention which provides a removable two-piece insulative cover adapted for installation over at least one conductor-supporting insulator (and in some cases two or more such insulators) in a manner to substantially enclose the insulator and greatly minimize the risk of electrical shock by virtue of inadvertent contact with the energized conductor. In addition, the respective sections of the complete cover are especially designed and include structure allowing easy manipulation and installation thereof with hot-line equipment, for added safety.

The cover in accordance with the invention preferably includes a pair of male and female cover sections each integrally formed of insulative synthetic resin material. Each section includes walls defining and enclosing space for the insulator, wherein the bottom wall portions of the sections are spaced apart to present an elongated slot which allows the section to be initially placed over and around an energized conductor, and slid along the latter to receive therein the upright supporting pin (in the case of a pin-type insulator), or the lower margin of the insulator itself (in the case of a post-type insulator). At the same time, the bottom wall of the complete cover is substantially closed so that it is difficult to inadvertently contact the protected conductor from beneath.

The two sections of the cover are telescopically interfitted at the enlarged open ends thereof, and means can be provided such as ribbing or external connectors to ensure that the sections remain securely fastened together during use.

BRIEF DESCRIPTION OF THE DRAWING

FIG. 6 is a longitudinal vertical section of the two-piece insulator depicted in FIGS. 1–3;

FIG. 7 is a bottom view of the male cover section illustrated in FIG. 4;

FIG. 8 is a fragmentary bottom view of the male cover section of a two-piece insulator cover designed for use with a post-type insulator; and FIG. 9 is a vertical sectional view of an insulator cover in accordance with the invention operatively installed on a post-type insulator.

DESCRIPTION OF THE PREFERRED EMBODIMENT

Figure 1:
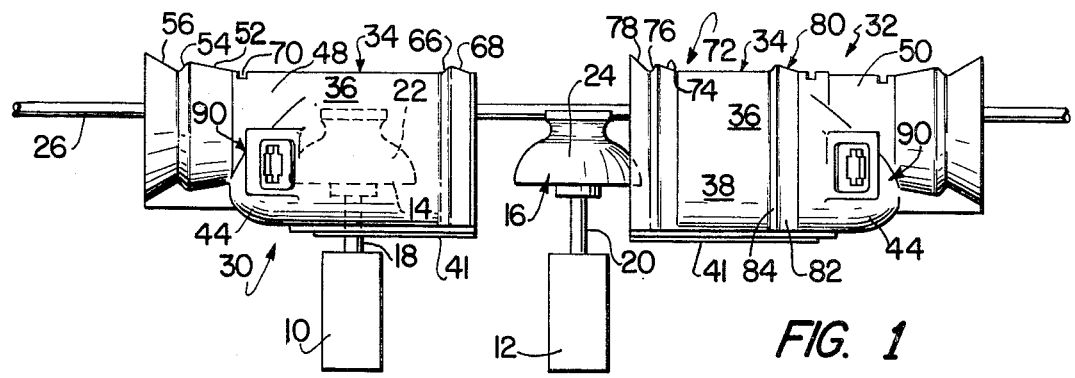
FIG. 1 is an elevational view depicting a pair of crossarm-supported pin-type insulators, an energized conductor supported by the spaced insulators, and the respective sections of the cover in accordance with the invention mounted on the conductor prior to telescopic interfitting of the sections to complete the cover.
Figure 2:
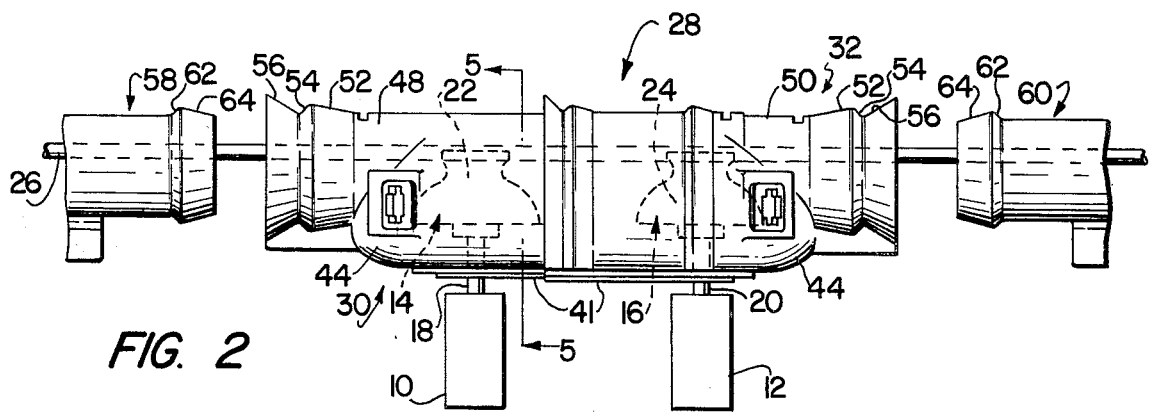
FIG. 2 is a view similar to that of FIG. 1, but depicts the cover sections telescopically interfitted and locked together, and also illustrates a pair of aligned spiral conductor covers ready for interconnection to the opposed ends of the insulator cover hereof.
Figure 3:
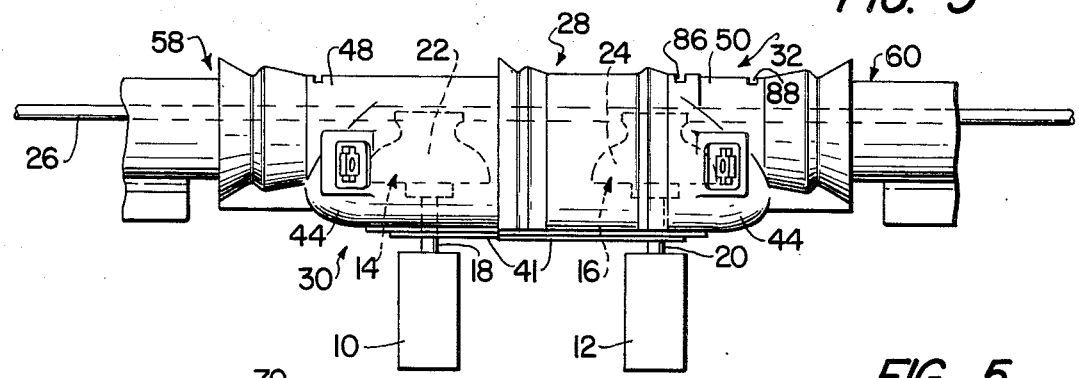
FIG. 3 is an elevational view similar to that of FIGS. 1 and 2, and shows the final interconnection of the insulator cover sections and the aligned spiral conductor covers.

FIGS. 1-3 illustrate a pair of conventional wooden crossarms 10 and 12 which respectively support horizontally spaced pin-type insulators 14 and 16. Each of the latter includes an upstanding pin 18, 20, secured to a corresponding crossarm 10, 12, as well as an arcuate porcelain insulator body 22, 24. The bodies are horizontally grooved at the top thereof in the usual fashion and cooperatively support an elongated electrical conductor 26.

The complete cover 28 (see FIGS. 2 and 3) of the invention broadly includes a pair of elongated, open ended, male and female telescopically interfitted separable cover sections 30 and 32. Each section is preferably formed of yieldable, insulative synthetic resin material such as high density polyethylene, and is integrally constructed. Of course, other insulative materials could be employed in lieu of the preferred polyethylene.

Figure 4:
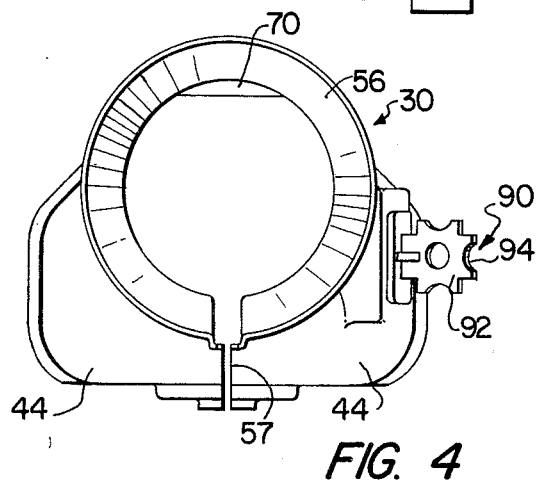
FIG. 4 is an end elevational view of the male cover section illustrated in FIGS. 1–3.
Figure 5:
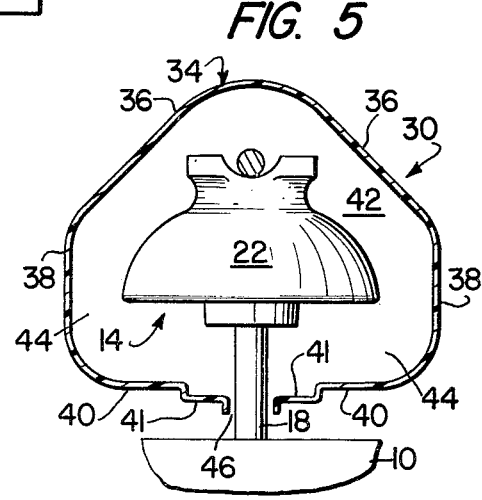
FIG. 5 is a vertical sectional view taken along line 5—5 of FIG. 2.

In any event, each section includes an elongated upper wall segment 34 (see FIG. 5) having depending laterally spaced parts. In practice, wall segment 34 is advantageously composed of a pair of elongated, outwardly diverging, interconnected top wall portions 36, and a pair of spaced, depending sidewall portions 38. Also, a pair of elongated, inwardly extending, generally opposed bottom wall portions 40 respectively extend from the walls 38 as best seen in FIGS. 4 and 5. The portions 40 also include innermost, opposed, elongated ribbed segments 41.

Thus, upper wall segment 34 and bottom wall portions 40 cooperatively define an elongated, insulator-receiving space 42 which extends along the length of the section from a first open end thereof and terminates in a pair of opposed, rounded closed end walls 44 respectively extending from each wall portion 36. As shown, the segment 34 and bottom wall portions 40 define a space 42 which is of substantially constant cross sectional area until the end walls 44 are reached, whereupon the latter smoothly taper towards the bottom wall portions 40. It will also be noted that the adjacent inner edges of the segments 41 are spaced apart a distance to define an elongated slot 46 for receiving an upstanding insulator-supporting pin; however, the width of slot 46 is considerably less than the maximum width of the insulator-receiving space 42, so that only a restricted opening is presented adjacent the insulator base.

An elongated, generally tubular, slotted end section 48, 50 extends from the end walls 44 of each cover section 30, 32 and communicates with the interior of the latter. The outermost end of each tubular section 48, 50 is configured to present a collar defined by three longitudinally aligned, interconnected, generally frustoconical connection segments 52, 54, and 56. End sections 48, 50, including the connection segments forming a part thereof, are slotted as at 57, with the slot 57 communicated with the slot 46 (see FIG. 7). The segments 52, 54, 56 cooperatively define a radial connection structure for allowing connection of the associated cover section 30, 32 to an additional, longitudinally aligned conductor cover such as the spiral conductor covers 58, 60 illustrated in FIGS. 2 and 3. Such spiral conductor covers are fully described in U.S. Pat. No. 3,835,238 incorporated by reference herein, and therefore need not be discussed in detail. Briefly however, it is noted that the respective spiral covers 58, 60, each include male connecting portions having frustoconical segments 62, 64 which are complemental and adapted to interfit within the connection structure presented by the segments 52, 54, and 56.

Male cover section 30 includes a connection collar at the end thereof opposite to tubular section 48. This collar includes a pair of outwardly extending, interconnected, somewhat frustoconical walls 66, 68 which extend about the wall portions 36 and sidewall portions 38. Also, an inwardly extending stop wall 70 is provided in section 48 adjacent the innermost edge of wall 52. As best seen in FIG. 4, the wall 70 extends into the tubular space defined by the section 48.

Female cover section 32 has a female connection collar 72 at the end thereof remote from tubular section 50. The collar 72 is composed of three interconnected, somewhat frustoconical, outwardly extending wall segments 74, 76, 78 which form a part of the wall portions 36 and 38. A secondary female connection collar 80 is also provided midway between the extreme ends of the cover section 32. This collar is defined by outwardly extending, somewhat frustoconical walls 82, 84 which form a part of the wall portions 36 and 38. A pair of inwardly extending stop walls 86 and 88 are also provided at the upper part of section 32. The wall 86 is located just to the right of collar 80 as viewed in FIGS. 1-3, whereas wall 88 is located just to the left of wall 52.

Each section 30, 32 also includes means thereon for allowing removable connection of a manipulative tool such as an elongated hot-line stick. Such means, referred to generally by the numeral 90, is preferably secured to a rounded wall portion 44 and includes an outwardly extending, apertured tab 92 having three spaced indentations 94 in the outer periphery thereof for connection purposes. As those skilled in the art will readily perceive, this sort of tab structure allows the associated section to be temporarily connected to the end of an elongated hot-line tool so that the section can be manipulated and installed from a position remote to the energized conductor 26.

In use when it is desired to cover one or more pin-type insulators of the type illustrated in FIGS. 1-3, the following procedure is followed. Male section 30 is installed over line 26 through the use of a hot-line tool and the means 90. This involves spreading the section 30 and passing line 26 through the elongated slots 46 and 57 thereof, and thereafter axially shifting the section 30 into covering relationship over insulator 14. In this orientation (see FIG. 1) upstanding pin 18 is received within the slot 46 and the body 22 of the insulator is substantially completely surrounded or encased by the section 30. This procedure is repeated using the female section 32 until this section is likewise disposed about the conductor 26. The female section 32 is then shifted axially until it is in covering relationship to the insulator 16 and the male section 30 is telescopically interfitted within section 32. Generally speaking, by virtue of the yieldable nature of the preferred sections, such interfitting can be readily accomplished. Moreover, a secure interconnection between the sections 30, 32 is established because of the interfitting of the collar-defining walls 66 and 68, with complemental collar 72 made up of the walls 74, 76, and 78 (see FIG. 6). In this orientation the two cover sections 30 and 32 form the complete cover 28 and serve to completely and safely cover the insulators 14 and 16 as well as the stretch of conductor 26 adjacent thereto. If the insulators are more closely spaced together, the male section 30 can be slid into female section 32 until secondary collar 80 is reached, whereupon the walls 66, 68 will interfit with walls 82 and 84. Excess movement of male section 30 into female section 32 is prevented by virtue of stop wall 86 provided adjacent collar 80.

In order to more fully protect the lineman working in the proximity of the conductor 26, the spiral conductor covers 58 and 60 can be placed over the conductor and suspended therefrom in the known fashion, whereupon the covers 58 and 60 can be separately shifted axially and interfitted within the female connection structure presented by the segments 52, 54 and 56 disposed at the opposite ends of the cover sections 30, 32. By virtue of the fact that the spaced spiral covers 58 and 60 are themselves suspended from the line 26 at their respective central portions, such interconnection serves to orient and space the cover 28 in the position illustrated in FIG. 3, or in a desirable spaced relationship to the insulator and line 26. In addition, the stop walls 70 and 88 respectively on the sections 30, 32 limit the maximum extent of telescopic movement of the spiral covers 58, 60 into the associated sections.

Turning now to FIGS. 8–9, a second embodiment of the invention is illustrated. In this case a cover 96 is provided which is identical in all constructional aspects and usage to the cover of FIGS. 1–7, save for the width of the lowermost slot. Specifically, in the cover 96 the inboard segments 41 are trimmed away to present a wider opening 98 which can accommodate the upstanding skirted insulator 100. All other portions of cover 96 are identical with the first-described embodiment, and corresponding reference numerals have accordingly been applied.

It will therefore be seen that the present invention provides very safe and efficient covers for installation over conductor-supporting insulators of the pin or post-type and in turn solves many of the problems which have heretofore been experienced with respect to such equipment and the safe and efficient temporary covering thereof.

Having thus described the invention, what is claimed as new and desired to be secured by Letters Patent is:

1. A removable two-piece insulative cover adapted for installation over at least one conductor-supporting insulator through use of an elongated manipulative tool by an installer remote from the insulator, said covering comprising:

elongated, open-ended, first and second separable cover sections each integrally formed of yieldable insulative synthetic resin material, each of said sections including an elongated upper wall segment having depending, laterally spaced parts;

a pair of elongated inwardly extending, generally opposed bottom wall portions respectively extending from said spaced parts, said wall segment and bottom wall portions cooperatively defining an elongated, insulator-receiving space which extends along the length of said section from one end thereof, the innermost adjacent edges of said bottom wall portions being spaced apart a distance less than the maximum width of said insulator-receiving space for presenting only a restricted opening for receiving a base of an insulator;

structure adjacent the end of said section remote from said one end for connection of the section to an additional, longitudinally aligned conductor cover; and means on said section for removable connection of a manipulative tool;

said one end of said first section being telescoped into said one end of the second section for presenting an interfitted cover.

2. The cover as set forth in claim 1 wherein said connection structure includes a connecting collar for telescopic interfitting with said additional conductor cover.

3. The cover as set forth in claim 2 including stop means for limiting the maximum extent of telescopic interfitting of said first and second sections.

4. The cover as set forth in claim 1 wherein said wall segment comprises an outwardly diverging top wall portion, and a pair of depending sidewall portions respectively extending from the sides of said top wall portion.

5. The cover as set forth in claim 1 including separate stop means adjacent opposite ends of said cover for limiting the maximum extent of telescopic interfitting of said first and second sections.

* * * * *